No. 771,430. PATENTED OCT. 4, 1904.
A. W. KRIEGER.
ROD PACKING.
APPLICATION FILED FEB. 8, 1904.
NO MODEL.
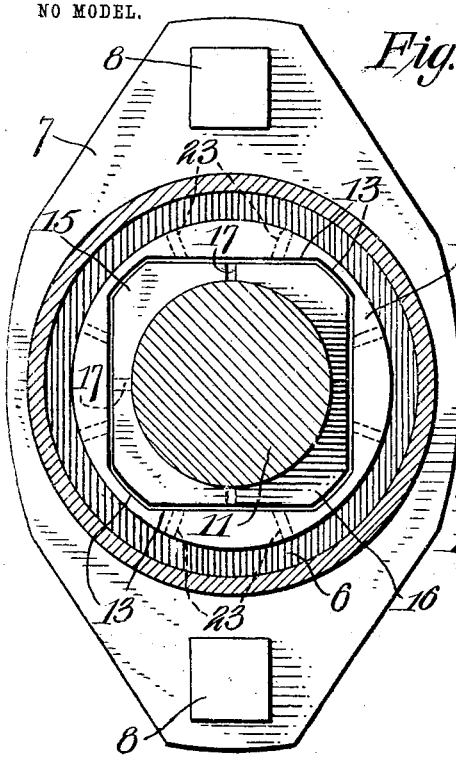
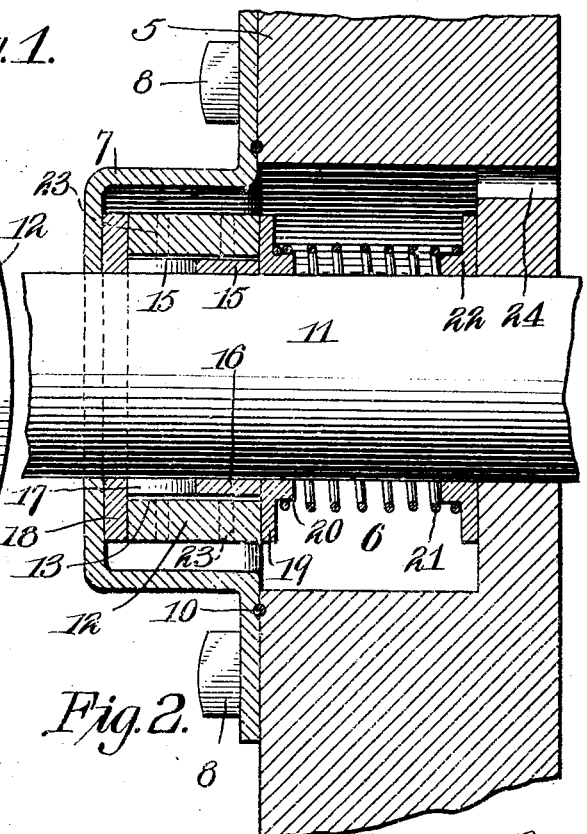
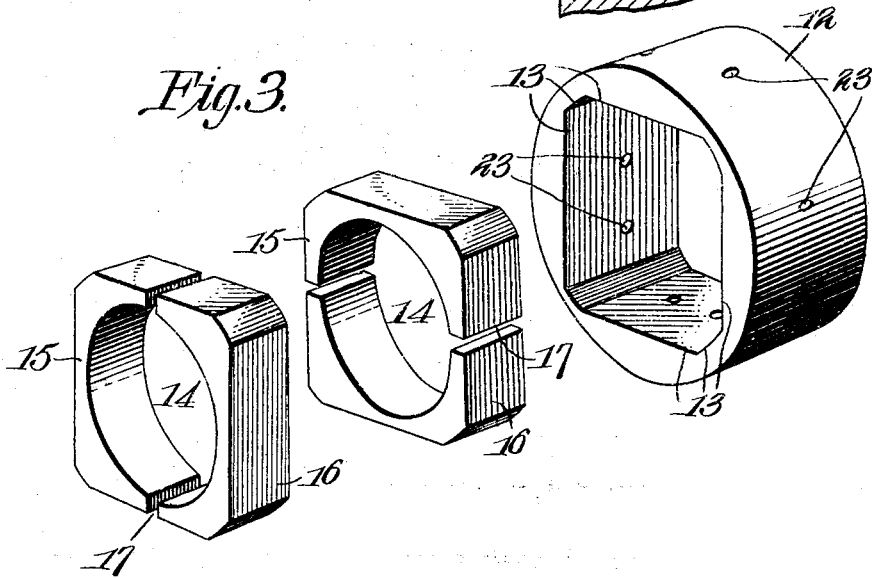
Witnesses  Alfred W. Krieger, Inventor.
           by C. A. Snow & Co.
           Attorneys No. 771,430. Patented October 4, 1904.

UNITED STATES PATENT OFFICE.

ALFRED W. KRIEGER, OF LAS VEGAS, TERRITORY OF NEW MEXICO.

ROD-PACKING.

SPECIFICATION forming part of Letters Patent No. 771,430, dated October 4, 1904.

Application filed February 8, 1904. Serial No. 192,625. (No model.)

*To all whom it may concern:*

Be it known that I, ALFRED W. KRIEGER, a citizen of the United States, residing at Las Vegas, in the county of San Miguel and Territory of New Mexico, have invented a new and useful Piston-Packing, of which the following is a specification.

This invention relates to an improved rod-packing for steam-engines and other machines, and has for its object to provide an inexpensive, durable, and efficient packing of this character in which the pressure of the steam on the packing rings or segments forces the latter in contact with the rod, and thereby maintains a steam-tight joint under all conditions.

A further object of the invention is to provide an outer cylindrical casing having a plurality of sectional packing rings or segments mounted thereon and arranged to break joint with each other, said rings or segments being locked within the casing against rotative movement, but capable of a limited outward play to thereby insure packing contact of the independent segments with the piston-rod.

A still further object of the invention is to provide a pair of bearing-collars adapted to engage the opposite ends of the cylindrical casing and retain the packing-segments within the same, the several parts comprising the packing being made in separate sections, so as to permit any individual section to be readily removed and replaced when worn or broken.

The invention consists in the construction and novel combination and arrangement of parts hereinafter fully described, illustrated in the accompanying drawings, and pointed out in the claims hereto appended, it being understood that various changes in form, proportion, and minor details of construction may be resorted to without departing from the principle or sacrificing any of the advantages of this invention.

In the accompanying drawings, forming a part of this specification, Figure 1 is a front elevation, partly in section, of a portion of an engine-cylinder, showing my improved rod-packing in position thereon. Fig. 2 is a longitudinal sectional view. Fig. 3 is a detail perspective view of the cylindrical casing and packing rings or segments detached.

Similar numerals of reference indicate corresponding parts in all the figures of the drawings.

The cylinder-head 5 is provided with an annular steam-chamber or stuffing-box 6, having a gland 7 secured to the face of the cylinder in any suitable manner, as by bolts 8, a gasket 10 being interposed between the cylinder-head and gland to form a steam-tight joint, as shown. Arranged within the gland 7 and encircling the piston-rod 11 is a cylindrical casing 12, the inner walls of which are squared to form a plurality of angular faces 13, preferably eight in number, as shown. Seated within the squared portion of the casing 12 are a series of packing rings or segments 14, each ring being preferably formed in two sections 15 and 16, having their inner faces curved to conform to the shape of the piston and arranged to break joints with each other, as shown. The adjacent edges of the sections comprising the packing-rings are spaced a short distance apart, as indicated at 17, so as to permit said sections to be forced in contact with the piston by the pressure of the steam within the cylinder, and thereby take up any wear on said sections incident to friction between the parts. One end of the cylindrical casing 12 rests against a bearing-collar 18, arranged within the gland 7 and engaging the front wall thereof, while a companion collar 19, provided with an annular shoulder 20, bears against the opposite end of the casing, said collars being adapted to prevent longitudinal displacement of the packing-segments within the casing and also serving to keep the casing in the proper position with the gland 7.

Arranged within the steam-chamber 6 and surrounding the rod 11 is a preferably coil-spring 21, one end of which engages the annular shoulder 20 and the opposite end thereof a back ring 22, the pressure of the spring on the collar 19 being sufficient to keep the several parts comprising the packing in their proper relative position.

A series of openings or steam-passages 23 are formed in the walls of the casing 12, said openings being so disposed that the expansive force of the steam from the cylinder will be uniformly exerted on the angular faces of the packing rings or segments, thereby forcing the same in contact with the piston-rod and insuring a steam-tight joint at all times. The steam is admitted from the engine-cylinder to the chamber 6 through suitable openings 24 and thence to the gland 7 and through the openings 23 in the cylindrical casing 12 to the packing rings or segments. As the bearing-faces of the sections comprising the segments become worn from constant use the effectiveness of the packing will not be impaired, inasmuch as the space between the adjacent faces of the sections will permit the latter to be forced inwardly toward each other, and thereby compensate for any wear on the parts.

By having the cylindrical casing, bearing-collars, and packing-rings formed in separate sections any particular section may be readily removed when broken and replaced at a small cost, while by having the sectional packing rings or segments arranged to break joint with each other it causes a uniform pressure to be exerted at all points on the piston-rod and effectually prevents the leakage of steam.

Having thus described the invention, what is claimed is—

1. In a rod-packing, the combination with a casing having interior angular walls provided with peripheral openings for the passage of steam, and a plurality of sectional packing-rings having corresponding exterior angular walls fitting within the casing and arranged to break joint with each other.

2. In a rod-packing, the combination with a casing having interior angular walls provided with peripheral openings for the passage of steam, a plurality of sectional packing-rings having corresponding exterior angular walls fitting within the casing and arranged to break joint with each other, and removable bearing-collars engaging the opposite ends of the casing and serving to retain the packing-rings within the casing.

3. In a rod-packing, the combination with a casing having interior angular walls provided with peripheral openings for the passage of steam, and a plurality of sectional packing-rings having corresponding exterior angular walls fitting within the casing and arranged to break joint with each other, the sections of each packing-ring having their adjacent edges spaced apart to thereby permit outward movement of said sections within the casing.

4. In a rod-packing, the combination with a stuffing-box and gland, of a piston-rod, a casing having interior angular walls provided with peripheral openings for the passage of steam arranged within the gland and surrounding the piston-rod, a plurality of sectional packing-rings having corresponding exterior angular walls fitting within the casing, a bearing-collar interposed between the gland and the forward end of the casing, a second collar engaging the rear end of the casing, and a spring arranged within the stuffing-box and engaging the second collar for preventing longitudinal movement of the casing within the gland.

5. In a rod-packing, the combination with a stuffing-box and gland, of a piston-rod, a casing having octagonal interior walls arranged within the gland and surrounding the piston, a plurality of packing-rings each formed in two sections having their adjacent edges spaced apart fitting within the casing, said sections being provided with corresponding exterior octagonal walls and arranged to break joint with each other, there being peripheral steam-passages formed in the walls of the casing communicating with the sectional packing-rings.

6. The combination with a cylinder-head provided with a stuffing-box, of a piston-rod, a gland secured to the cylinder-head, a gasket interposed between the gland and said cylinder-head, a casing having octagonal interior walls provided with peripheral openings for the passage of steam arranged within the gland and surrounding the piston, a pair of sectional packing-rings provided with corresponding exterior octagonal walls fitting within the casing and having their adjacent edges spaced apart, a bearing-collar engaging the front and rear ends of the casing, a back ring bearing against the cylinder-head, and a coil-spring surrounding the piston-rod and interposed between the collar on the rear end of the casing and the back ring.

In testimony that I claim the foregoing as my own I have hereto affixed my signature in the presence of two witnesses.

ALFRED W. KRIEGER.

Witnesses:
  WM. G. HAYDON,
  M. GREENBERGER.